US006246219B1

(12) United States Patent
Lynch et al.

(10) Patent No.: US 6,246,219 B1
(45) Date of Patent: Jun. 12, 2001

(54) STRING SWITCHING APPARATUS AND ASSOCIATED METHOD FOR CONTROLLABLY CONNECTING THE OUTPUT OF A SOLAR ARRAY STRING TO A RESPECTIVE POWER BUS

(75) Inventors: Thomas Henry Lynch, Chatsworth; Robert Kezerian Wilde, Thousand Oaks; John Keith Branom, Newbury Park; James Allen Hartung, West Hills, all of CA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/535,391

(22) Filed: Mar. 24, 2000

(51) Int. Cl.[7] ........................................................ G05F 3/16
(52) U.S. Cl. ............................ 323/223; 323/906; 320/101
(58) Field of Search ..................................... 323/906, 220, 323/223, 224; 307/44, 52, 60, 80; 320/101

(56) References Cited

U.S. PATENT DOCUMENTS

| 3,600,599 | | 8/1971 | Wright et al. . | |
|---|---|---|---|---|
| 3,696,286 | * | 10/1972 | Ule ....................................... | 320/101 |
| 4,186,336 | | 1/1980 | Weinberg et al. . | |
| 4,306,183 | | 12/1981 | Wright . | |
| 4,812,737 | | 3/1989 | Fleck . | |
| 4,999,524 | | 3/1991 | Williams et al. . | |
| 5,025,202 | * | 6/1991 | Ishii et al. ............................... | 320/32 |
| 5,196,781 | | 3/1993 | Jamieson et al. . | |
| 5,289,998 | | 3/1994 | Bingley et al. . | |
| 5,327,071 | | 7/1994 | Frederick et al. . | |
| 5,504,418 | | 4/1996 | Ashley . | |
| 5,550,411 | | 8/1996 | Baker . | |
| 5,604,430 | | 2/1997 | Decker et al. . | |
| 5,698,970 | | 12/1997 | Stanojevic . | |
| 5,814,903 | * | 9/1998 | Wu ....................................... | 307/125 |
| 5,856,740 | | 1/1999 | Rau et al. . | |
| 5,861,735 | | 1/1999 | Uchida . | |
| 6,049,190 | * | 4/2000 | Canter et al. ........................ | 320/101 |

\* cited by examiner

Primary Examiner—Adolf Deneke Berhane
(74) Attorney, Agent, or Firm—Alston & Bird LLP

(57) ABSTRACT

An improved string switching apparatus and method is provided for controllably connecting a plurality of solar array strings to an output power bus. The string switching apparatus can include a plurality of field effect transistors electrically connected in parallel with respective solar array strings and a digital controller for controllably switching the field effect transistors between on and off states to thereby control the power level of the output power bus. The field effect transistors can be switched between an on state in which the output of the respective solar array string is shunted and an off state in which the output of the respective solar array string is delivered to the output power bus. In addition to merely providing power to an output power bus, the string switching apparatus and method can controllably connect the plurality of solar array strings to either an output power bus or an auxiliary power bus, such as a battery charging power bus. In addition to the plurality of shunt regulators, the string switching apparatus can include a plurality of coupling switches electrically connected between respective solar array strings and one of the output power bus and the auxiliary power bus for controllably directing the power to a selected one of the power buses.

15 Claims, 3 Drawing Sheets

STRING SWITCHING APPARATUS AND ASSOCIATED METHOD FOR CONTROLLABLY CONNECTING THE OUTPUT OF A SOLAR ARRAY STRING TO A RESPECTIVE POWER BUS

FIELD OF THE INVENTION

The present invention relates generally to the regulation of solar array strings and, more particularly, to a string switching apparatus and associated methods.

BACKGROUND OF THE INVENTION

Solar arrays are widely used to provide power for both space and terrestrial applications. In space, for example, solar arrays provide power for spacecraft and the like. With respect to terrestrial applications, solar arrays oftentimes replenish storage batteries and provide power for equipment and instrumentation located remote from conventional power sources.

Solar arrays are generally comprised of a number of solar array strings. The solar array strings are combined, such as in a parallel arrangement, to provide power via an output power bus. The power level of the output power bus is desirably maintained at a predetermined level that may remain constant or that may vary in a preset manner over time. Unfortunately, the power provided by a conventional solar array varies based upon a number of factors such that its unregulated output generally will not remain at the desired power level. The factors that can alter the output of a solar array include temperature variations of the solar array and its surroundings and variations in the solar radiation incident upon the solar array. Among other things, the variations in the solar radiation that is incident upon the solar array include variations in the angle of incidence and the magnitude of the intensity of the radiation incident upon the solar array.

Therefore, regulators have been developed to control the output power of a solar array. These regulators are typically classified as either a series-type or a shunt-type regulator depending upon whether the active element of the regulator is in series with the solar array or in parallel with the solar array, respectively. Conventionally, series-type regulators have difficulty providing acceptable switching characteristics. These switching characteristics include, for example, the power requirements of each switch that connects a respective solar array string to the output power bus as well as the large number of switches required to control the solar array strings and the associated control logic required to control the switches. As such, a variety of shunt-type regulators have been developed.

As will be apparent, shunt-type regulators control the delivery of power to the output power bus by selectively connecting a respective solar array string to either the output power bus or to ground or some other load in order to dissipate the energy provided by the solar array string. While shunt-type regulators are acceptable for certain applications, shunt-type regulators are generally constructed of numerous analog components, including a substantial number of switches and associated control circuitry. Because of the relative large number of components, shunt-type regulators generally require substantial fabrication time and are correspondingly expensive. In addition, shunt-type regulators are oftentimes relatively large and heavy, thereby limiting the number of applications for which shunt-type regulators are acceptable. Since shunt-type regulators must generally include dissipative elements for dissipating the energy generated by the respective solar array strings, a shunt-type regulator is also susceptible to thermal stress failures due to the thermal loads dissipated by the dissipative element.

In order to control the power level of the output power bus, a conventional shunt-type regulator apparatus sequentially steps through the solar array by shunting different ones of the solar array strings, either individually or in different combinations, until the power delivered to the output power bus is at the desired power level. Since a conventional shunt-type regulator apparatus must step through the solar array by sequentially connecting different combinations of the solar array strings to the output power bus, a shunt-type regulator apparatus is relatively slow to respond to changes in the power level of the output power bus and is limited by its slew rate.

As a result of the architecture of a conventional shunt-type regulator apparatus, the shunt-type regulator associated with one solar array string is not typically independent of the shunt-type regulators associated with the other solar array strings. As such, the failure of a single component can lead to the failure of the entire shunt-type regulator apparatus. Since a conventional shunt-type regulator apparatus includes a relatively large number of analog components, a conventional shunt-type regulator apparatus therefore generally has an undesirably large overall failure rate. Since solar arrays are typically disposed either in space or in terrestrial applications that are relatively remote, the failure of a conventional shunt-type regulator apparatus is particularly undesirable due to the difficulty in repairing or replacing the shunt-type regulator apparatus.

While a number of regulators have been developed for controlling the delivery of power by solar array strings to an output power bus, these conventional regulators suffer from a number of disadvantages. As such, it would be desirable to provide a regulator apparatus that is capable of quickly and controllably altering the power level of the output power bus by connecting any combination of the solar array strings to the output power bus. In addition, it would be desirable for a regulator apparatus to be resistant or tolerant to the failure of the regulators associated with one or more of the solar array strings such that the regulator apparatus can continue to operate despite these failures. Furthermore, it would be desirable for a regulator apparatus to include fewer components so as to be lighter, smaller and less expensive and to require generally less time for fabrication than a conventional regulator apparatus.

SUMMARY OF THE INVENTION

The present invention therefore provides an improved string switching apparatus and an associated method for controllably connecting a plurality of solar array strings to an output power bus. According to one embodiment, the string switching apparatus includes a plurality of field effect transistors, such as MOSFETs, electrically connected in parallel with respective solar array strings and a digital controller for controllably switching the field effect transistors between on and off states to thereby control the power level of the output power bus. By utilizing field effect transistors operating under the control of a digital controller, the string switching apparatus of this embodiment can be relatively small, light weight and inexpensive and offers rapid response time to changing power levels due to the capability of quickly selecting any combination of solar array strings for connection to the output power bus without having to step through a predetermined sequence of solar array strings. In addition, the string switching apparatus of this embodiment is relatively fault tolerant such that the string switching apparatus can continue to function even though the shunt-type regulator that is associated with one or more individual solar array strings becomes defective, thereby improving the reliability and longevity of the string switching apparatus of the present invention.

According to this embodiment, the plurality of field effect transistors can be witched between an on state in which the output of the respective solar array string is shunted and an off state in which the output of the respective solar array string is delivered to the output power bus, by means of control signals provided by the digital controller. More specifically, the string switching apparatus can include a plurality of drive circuits associated with respective to field effect transistors and responsive to the digital controller. In this embodiment, each drive circuit controllably switches the respective field effect transistor between on and off states in response to commands from the digital controller. Preferably, the plurality of drive circuits are embodied in a programmable logic array to further reduce the part count, size and weight of the string switching apparatus. The string switching apparatus of this embodiment also includes a plurality of coupling diodes electrically connected between respective solar array strings and the output power bus to control the delivery of power thereto.

According to another embodiment, a string switching apparatus and method is provided for controllably connecting the plurality of solar array strings to either an output power bus or an auxiliary power bus, such as a battery charging power bus. By permitting the solar array strings to not only provide power to the output power bus, but also to deliver power to other power busses, such as to charge a battery, the power provided by the solar array can be more efficiently utilized and less power needs to be shunted or otherwise dissipated. According to this embodiment, the string switching apparatus includes a plurality of shunt regulators, such as field effect transistors, electrically connected in parallel with respective solar array strings. Each shunt regulator is capable of shunting the output of the respective solar array string. However, each shunt-type regulator is also capable of permitting the output of the respective solar array string to be delivered to one of the output power bus and the auxiliary power bus. The string switching apparatus of this embodiment also includes a plurality of coupling switches electrically connected between respective solar array strings and one of the output power bus and the auxiliary power bus. Typically, the plurality of coupling switches are electrically connected between the respective solar array strings and the auxiliary power bus. Each coupling switch is capable of switching between an on state in which an output of the respective solar array string is delivered to the respective power bus, such as the auxiliary power bus, and an off state in which the output of the respective solar array string is delivered to the other power bus, such as the output power bus. Further, the string switching apparatus includes a controller for controlling the plurality of shunt regulators and the plurality of coupling switches. As such, the string switching apparatus and method of this embodiment provides for the controlled delivery of power to both the output power bus and the auxiliary power bus.

The string switching apparatus of this embodiment can also include a plurality of first drive circuits associated with respective coupling switches and responsive to the controller. Each first drive circuit controllably switches the respective coupling switch between on and off states in response to commands from the controller. The string switching apparatus of this embodiment can also include a plurality of second drive circuits associated with respective shunt regulators and responsive to the controller. Each second drive circuit controllably switches the respective shunt regulator between an on state in which the output of the respective solar array string is shunted and an off state in which the output of the respective solar array string is delivered to one of the output power bus and the auxiliary power bus in response to commands from the controller. Typically, the first and second drive circuits are embodied in a programmable logic array to further reduce the part count, cost and complexity of the string switching apparatus.

The string switching apparatus can also include a plurality of coupling diodes electrically connected between respective solar array strings and both the output power bus and the auxiliary power bus. For example, the coupling diodes can include a plurality of output power coupling diodes and a plurality of auxiliary power coupling diodes. The output power coupling diodes are electrically connected between respective solar array strings and the output power bus, while the plurality of the auxiliary power coupling diodes are electrically connected between respective solar array strings and the auxiliary power bus.

According to this embodiment, the output of each solar array string is selectively directed to the output power bus, the auxiliary power bus or a shunt path such that the output power bus and the auxiliary power bus are maintained at respective predetermined power levels. In this regard, the shunt regulator is actuated, such as by switching the shunt regulator to an on state, in instances in which the output of the respective solar array string is to be directed to the shunt path. In contrast, the shunt regulator is deactuated, such as by switching the field effect transistor to an off state, in instances in which the output of the respective solar array string is to be directed to either the output power bus or the auxiliary power bus. In instances in which the respective solar array string is not shunted, the output of the solar array string can be switchably connected to one of the output power bus and the auxiliary power bus, typically to the auxiliary power bus. Alternatively, the output of the respective solar array string can be switchably disconnected from the respective power bus, such as the auxiliary power bus, in instances in which the power is to be delivered to the other power bus, such as the output power bus. Most typically, each solar array string is switchably connected to either the output power bus or the auxiliary power bus by a field effect transistor. As such, the respective solar array string is switchably connected to the respective power bus by switching the field effect transistor to an on state, while the respective solar array string is switchably disconnected from the respective power bus by switching the field effect transistor to an off state. The respective power levels of the output power bus and the auxiliary power bus can also be monitored such that the selected direction of the output of each solar array string is based upon the monitored power levels and, more particularly, the relationship of the monitored power levels to the respective predetermined power levels.

Therefore, the string switching apparatus and associated method of the present invention provides for the rapid and controlled adjustment of the power level of the output power bus by providing for the digital control of a plurality of field effect transistors in order to selectively shunt one or more solar array strings. In addition, the string switching apparatus has a reduced part count, lower cost, and is lighter weight than a conventional regulator apparatus. Moreover, the string switching apparatus is relatively fault tolerant such that the failure of the shunt regulator associated with one or more of the solar array strings will not cause the entire string switching apparatus to fail. Alternative embodiments of the string switching apparatus and method also provide for the controlled delivery of power not only to an output power bus, but also to an auxiliary power bus, such as a battery charging power bus. Thus, the string switching apparatus and method of this embodiment can even more efficiently utilize the power provided by a solar array by not requiring as much power to be shunted.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
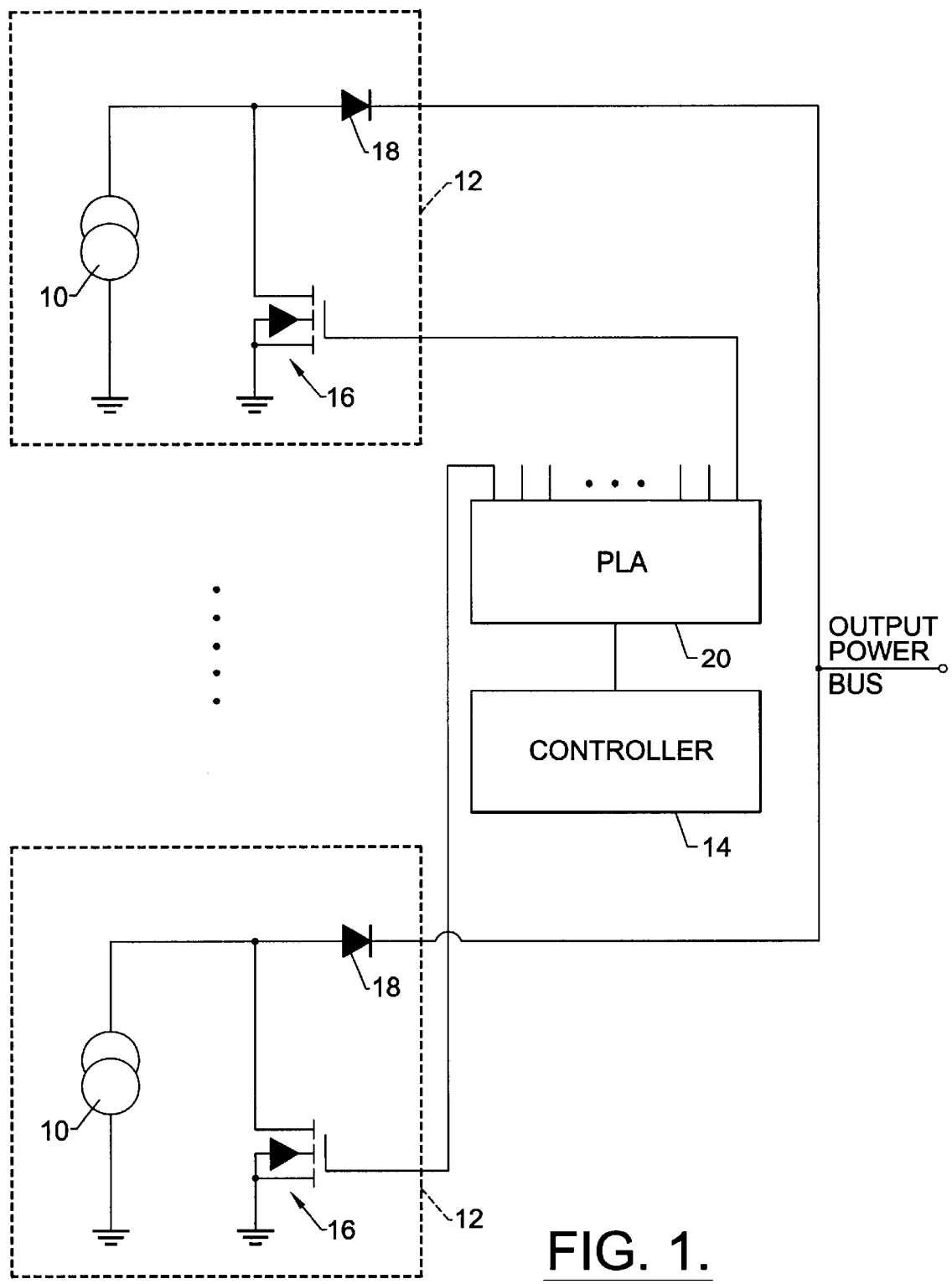
FIG. 1 is a block diagram of the string switching apparatus according to one embodiment of the present invention.

A solar array is typically comprised of a plurality of solar array strings 10. While the output of each solar array string is typically connected to the same output power bus, the string switching apparatus of the present invention preferably includes a separate control circuit 12 associated with each solar array string. FIG. 1 therefore depicts two solar array strings of a solar array that includes N total solar array strings. As FIG. 1 also illustrates, the control circuit associated with each solar array string is preferably controlled by a common controller 14, such as a computer, a microprocessor, a microcontroller or the like.

Each control circuit 12 includes a shunt regulator 16 electrically connected in parallel to the respective solar array string 10 so as to controllably shunt the output of the respective solar array string to ground. Thus, the shunt regulator can alternately be actuated so as to direct the output of the respective solar array string along the shunt path to ground, or deactuated such that the output of the respective solar array string is not shunted but is, instead, delivered to the power bus.

As depicted in FIG. 1, the shunt regulator 16 preferably includes a field effect transistor, such as a MOSFET, electrically connected in parallel with the respective solar array string 10. The field effect transistor is therefore capable of switching between an on state in which the output of the respective solar array string is shunted and an off state in which the output of the respective solar array string is delivered to a power bus. According to the present invention, the shunt regulator is preferably comprised of a field effect transistor, such as a MOSFET, since a field effect transistor has desirable switching characteristics and can be reliably and quickly switched on and off based upon the control signal applied to its gate. Relative to the dissipative elements, such as resistors, employed by conventional shunt regulators, the field effect transistors of the string switching apparatus of the present invention do not dissipate significant amounts of the output power provided by the respective solar array string. Instead, the output power is typically provided to the other electronics associated with the plurality of solar array strings. As such, the field effect transistor is substantially less susceptible to thermal stress failure than the dissipative elements of conventional shunt regulators, thereby increasing the reliability and longevity of the string switching apparatus of the present invention.

The string switching apparatus also typically includes a coupling diode 18 electrically connected between the respective solar array string 10 and the power bus, such as the output power bus. The coupling diode permits the output power provided by the respective solar array string to be delivered to the power bus in instances in which the field effect transistor has not been actuated, i.e., is in the off state. In this regard, the coupling diode preferably only introduces a small voltage drop, such as one volt, such that the vast majority of the output power provided by the respective solar array string is delivered to the power bus. However, the coupling diode prevents or blocks the flow of power from the power bus to the solar array string and/or the field effect transistor in instances in which the power bus is at a higher potential than the solar array string, such as in instances in which the field effect transistor has been actuated in order to shunt the output power of the respective solar array string.

Each field effect transistor is preferably controlled by a common digital controller 14 for controllably switching the field effect transistors between the on and off states so as to control the power level of the power bus, such as the output power bus. In this regard, the string switching apparatus of the present invention can almost instantaneously actuate or deactuate any combination of field effect transistors so as to collectively deliver the output power provided by the respective solar array strings to the output power bus. As such, the string switching apparatus of the present invention and, more particularly, the digital controller can quickly adjust the power level of the output power bus to any desired power level from zero to the maximum output power of the solar array by selectively actuating any combination of the field effect transistors. As will be apparent, the string switching apparatus of the present invention therefore need not step through or sequentially actuate the shunt regulators in any particular order as required by a conventional shunt regulator in order to adjust the power level of the output power bus. Thus, the string switching apparatus of the present invention provides greater responsiveness than conventional shunt regulators.

Although the digital control of each field effect transistor can be implemented in various fashions, the string switching apparatus of FIG. 1 includes a digital controller 14 that issues commands to a plurality of drive circuits associated with the respective field effect transistors. Each drive circuit is designed to receive a digital signal from the digital controller indicating the desired state of the respective field effect transistor and, in turn, to generate the control signal necessary to place the respective field effect transistor in the desired state. As depicted, the plurality of drive circuits are oftentimes embodied by a programmable logic array (PLA) 20 in order to further reduce the part count and simplify the design and fabrication of the string switching apparatus. However, the plurality of drive circuits can be implemented in other fashions if so desired.

As described above, the string switching apparatus of this embodiment is extremely responsive and can quickly adjust the power level of the power bus, such as the output power bus, to any desired power level. In addition, the string switching apparatus of this embodiment has relatively few components and can, therefore, be relatively easily fabricated. Correspondingly, the string switching apparatus is relatively small and light weight and can be substantially less expensive than a conventional shunt regulator. Moreover, the highly parallel design of the string switching apparatus with a separate shunt regulator 16 for each respective solar array string 10 permits the string switching apparatus to be substantially fault tolerant. In this regard, the failure of one or more field effect transistors will not generally serve to disable the entire string switching apparatus since the solar array strings associated with the other field effect transistors that remain operable can still be controllably switched on and off in order to control the power level of the power bus. Thus, the reliability and longevity of the string switching apparatus may be improved relative to conventional shunt regulator designs.

Figure 2:
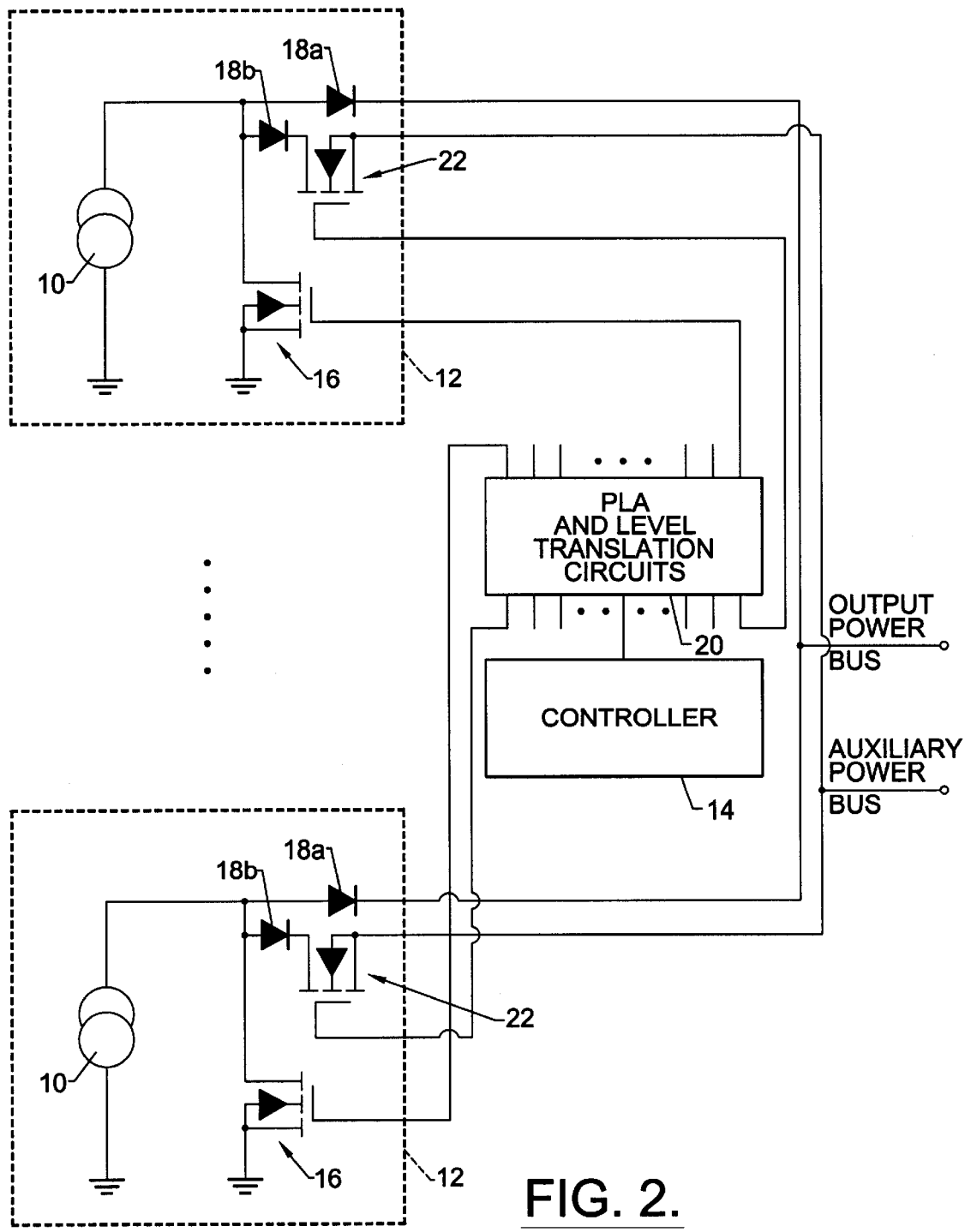
FIG. 2 is a block diagram of a string switching apparatus of another embodiment of the present invention illustrating the controlled delivery of power to both an output power bus and an auxiliary power bus, such as a battery charging power bus.

An alternative embodiment of a string switching apparatus of the present invention is depicted in FIG. 2. As shown, the string switching apparatus of this embodiment is also designed to switchably connect a plurality of solar array strings 10 to one or more power busses by means of a plurality of control circuits 12 associated with the respective solar array strings. As depicted in conjunction with FIG. 1, the control circuitry associated with two of the solar array strings are depicted in FIG. 2 with the other solar array strings of the solar array preferably being controlled in a similar, if not identical, manner.

As described in conjunction with the embodiment of FIG. 1, the string switching apparatus of this embodiment also includes a shunt regulator 16 electrically connected in parallel with a respective solar array string 10. As illustrated, the shunt regulator is preferably comprised of a field effect transistor, such as a MOSFET, that can be controllably switched between an on state in which the output of the respective solar array string is shunted to ground and an off state in which the output of the respective solar array string is delivered to a power bus, as described below. With respect to the control of the shunt regulator, such as the field effect transistor, a controller 14, such as the digital controller described in conjunction with the embodiment of FIG. 1, issues control signals that define the desired state of the shunt regulator. As also described above in conjunction with FIG. 1, the string switching apparatus of this embodiment typically includes a drive circuit associated with each respective shunt regulator for controllably switching the shunt regulator between an on state and an off state in response to control signals from the controller. In the illustrated embodiment in which the shunt regulators are comprised of field effect transistors, each drive circuit controllably switches a respective field effect transistor between an on state and an off state by controllably biasing the gate of the field effect transistor in response to the control signals from the controller.

The string switching apparatus of this embodiment is capable of selectively delivering the output power provided by the solar array strings 10 not merely to the output power bus but, instead, to a selected one of a plurality of power busses. Typically, the string switching apparatus selectively provides the power delivered by each solar array string to either the output power bus as described above in conjunction with the embodiment of FIG. 1 or an auxiliary power bus designed to supply power to auxiliary circuitry. For example, the auxiliary power bus may be a battery charging power bus that delivers power to charge one or more batteries. By permitting the output power provided by the solar array strings to not merely be directed to the output power bus, but also to be selectively delivered to one or more auxiliary power busses, the output power provided by the solar array can be more efficiently utilized since power that is generated by the solar array that is not delivered to the output power bus can be utilized for a useful purpose, such as charging back-up batteries or the like, and not merely dissipated as a result of being shunted to ground. In addition, by not requiring as much of the output power to the shunted, the thermal stress placed on the shunt regulators 16, such as the field effect transistors, is also correspondingly reduced, thereby further improving the reliability and lifetime of the shunt regulators of the string switching apparatus of this embodiment of the present invention.

In order to selectively deliver the output power generated by the solar array strings 10 to either the output power bus or an auxiliary power bus, the string switching apparatus of this embodiment includes a coupling switch 22 electrically connected between a respective solar array string and one of the power busses, namely, the power bus that operates at the lower potential. In the embodiment illustrated in FIG. 2, each coupling switch is capable of switching between an on state in which the output of the solar array string is delivered to the respective power bus, namely, that power bus with which the coupling switch is in-line, and an off state in which the output of the solar array string is directed to the other power bus, namely, that power bus with which the coupling switch is not in-line. As also illustrated by FIG. 2, the coupling switch is typically a field effect transistor, such as an MOSFET, since field effect transistors have advantageous switching characteristics as described above.

While a separate coupling switch 22 can be electrically connected between the respective solar array string 10 and each of the candidate power busses, the string switching apparatus need not necessarily include a coupling switch between the respective solar array string and the power bus that is at the highest potential, typically the output power bus. With respect to the embodiment depicted in FIG. 2 which includes an output power bus and an auxiliary power bus operating at a lower potential level, the power generated by the respective solar array string will be delivered to the power bus operating at the lowest potential when the coupling switch has been actuated and the power generated by the respective solar array string could otherwise be delivered to either power bus. In instances in which the solar array is designed to selectively deliver power to three or more power busses, separate coupling switches are preferably electrically connected between the respective solar array string and each of the power busses other than the power bus at the highest potential, i.e., the output power bus. By selectively controlling the state of the plurality of coupling switches, the output power provided by the respective solar array string can be delivered to the desired power bus, thereby maintaining each of the power busses at the desired power levels.

As described in conjunction with the field effect transistor of the shunt regulator 16, the field effect transistor that preferably serves as the coupling switch 22 is generally controlled in response to control signals provided by the controller 14.

As also described in conjunction with the field effect transistors of the shunt regulators, the string switching apparatus of this embodiment also preferably includes drive circuits, also known as level translation circuits, for receiving the control signals issued by the controller and for appropriately biasing the gate of the field effect transistor of each coupling switch in order to alternatively place the field effect transistors in on and off states. In order to reduce the part count, the level translation circuits associated with each coupling switch are generally embodied by a programmable logic array 20 and, most typically, the same programmable logic array that includes the drive circuits associated with each shunt regulator.

In order to control the flow of power from the solar array strings 10 to the various power busses while preventing power flow in the reverse direction, i.e., from a respective power bus to a solar array string or the associated control circuitry, the string switching apparatus can also include at least one coupling diode 18 electrically connected between the respective solar array string and each power bus, such as the output power bus and the auxiliary power bus in the embodiment of FIG. 2. Typically, the string switching apparatus of this embodiment includes a separate coupling diode electrically connected between the respective solar array string and each power bus. For example, the string switching apparatus can include an output power coupling diode 18a electrically connected between the respective solar array string and the output power bus and an auxiliary powered coupling diode 18b electrically connected between the respective solar array string and the auxiliary power bus. As such, the power generated by the solar array strings can be selectively delivered to the respective power buses without permitting the power levels at which the respective power busses are maintained from adversely affecting the solar array strings or the control circuitry associated therewith.

Figure 3:
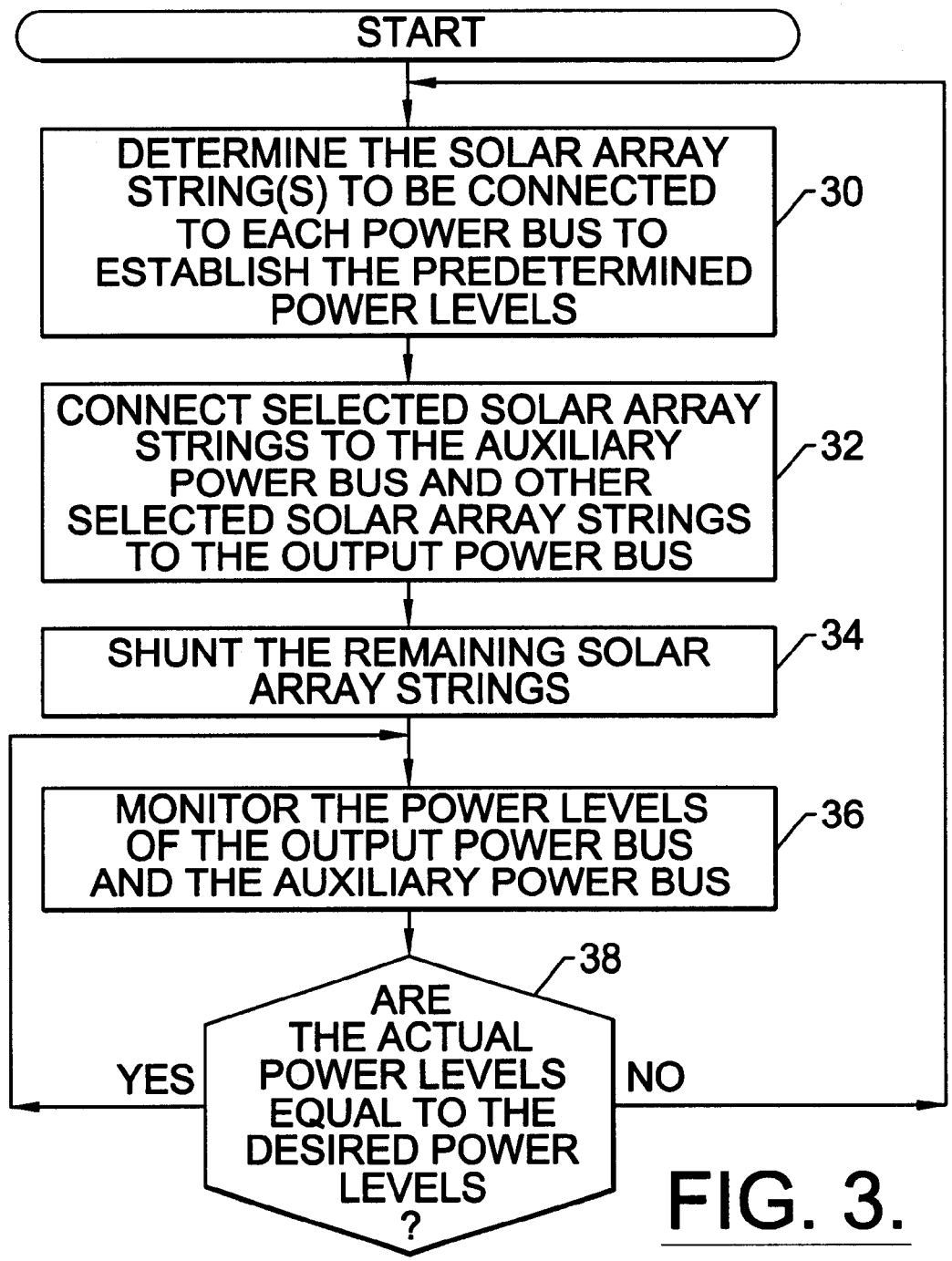
FIG. 3 is a flow chart illustrating the operations performed by a string switching apparatus and method according to one embodiment of the present invention.

In operation, the output of each solar array string 10 is therefore selectively directed to the output power bus, the auxiliary power bus or a shunt path such that the output power bus and the auxiliary power bus are maintained at respective predetermined power levels. In this regard, the controller 14 can determine which of the solar array strings should be connected to the output power bus, which of the solar array strings should be connected to the auxiliary power bus and which of the solar array strings should be shunted in order to maintain the output power bus and the auxiliary power bus at respective predetermined power levels. See block 30 of FIG. 3. Based upon this determination, the controller issues control signals that cause the drive circuits embodied by the PLA 20 to appropriately bias the shunt regulators 16 by means of the drive circuits and the coupling switches 22 by means of the level translation circuits to thereby direct the output power provided by the solar array strings as desired. See blocks 32 and 34. In this regard, actuation of a shunt regulator will cause the output power of the respective solar array string to be directed along the shunt path. On the other hand, the output power provided by the respective solar array string will be delivered to one of the power busses in instances in which the shunt regulator is in an off state. In instances in which the shunt regulator is in an off state, the power bus to which the output of the respective solar array string is delivered is dependent upon the state of the coupling switch. In this regard, in instances in which the coupling switch is actuated so as to be in an on state, the output provided by the respective solar array string is delivered to the power bus with which the coupling switch is in-line, such as the auxiliary power bus. In contrast, in instances in which the coupling switch is in an off state, the output provided by the respective solar array string will be delivered to the other power bus, namely, that power bus with which the coupling switch is not in-line, such as the output power bus. By monitoring the respective power levels of the output power bus and the auxiliary power bus, the controller can redirect the output of each solar array string, if necessary, to another power bus or to ground in order to maintain each power bus at the desired power level. See blocks 36 and 38.

Therefore, the string switching apparatus and associated method of the present invention provides for the rapid and controlled adjustment of the power level of the output power bus by permitting the digital control of a plurality of field effect transistors in order to selectively shunt one or more solar array strings 10. In addition, the string switching apparatus has a reduced part count, lower cost, and is lighter weight than a conventional regulator apparatus. Moreover, the string switching apparatus is relatively fault tolerant such that the failure of the shunt regulator 16 associated with one or more of the solar array strings will not cause the entire string switching apparatus to fail. Alternative embodiments of the string switching apparatus and method also provide for the controlled delivery of power not only to an output power bus, but also to an auxiliary power bus, such as a battery charging power bus. Thus, the string switching apparatus and method of this embodiment can even more efficiently utilize the power provided by a solar array and will not require as much power to be shunted.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A string switching apparatus for controllably connecting a plurality of solar array strings to one of an output power bus and an auxiliary power bus, the string switching apparatus comprising:

a plurality of shunt regulators electrically connected in parallel with respective solar array strings, each shunt regulator capable of alternately shunting an output of the respective solar array string and delivering the output of the respective solar array string to one of the output power bus and the auxiliary power bus;

a plurality of coupling switches electrically connected between respective solar array strings and one of the output power bus and the auxiliary power bus, each coupling switch capable of switching between an on state in which an entire, unshunted output of the respective solar array string is delivered to the respective power bus and an off state in which the entire, unshunted output of the respective solar array string is directed to the other power bus such that the entire, unshunted output of the respective solar array string is directed to only one power bus at a time; and a controller for controlling said plurality of shunt regulators and said plurality of coupling switches to thereby control the delivery of power to both the output power bus and the auxiliary power bus.

2. A string switching apparatus according to claim 1 further comprising a plurality of first drive circuits associated with respective coupling switches and responsive to said controller, wherein each first drive circuit controllably switches the respective coupling switch between on and off states in response to commands from said controller.

3. A string switching apparatus according to claim 2 further comprising a plurality of second drive circuits associated with respective shunt regulators and responsive to said controller, wherein each second drive circuit controllably switches the respective shunt regulator between an on state in which the output of the respective solar array string is shunted and an off state in which the output of the respective solar array string is delivered to one of the output power bus and the auxiliary power bus in response to commands from said controller.

4. A string switching apparatus according to claim 3 further comprising a programmable logic array that includes said plurality of first and second drive circuits for controlling said coupling switches and said shunt regulators, respectively, in response to commands from said controller.

5. A string switching apparatus according to claim 1 wherein said plurality of coupling switches are electrically connected between respective solar array strings and the auxiliary power bus such that, in the on state, each coupling switch delivers the output of the respective solar array string to the auxiliary power bus and, in the off state, each coupling switch delivers the output of the respective solar array string to the output power bus.

6. A string switching apparatus according to claim 5 wherein said plurality of coupling switches are electrically connected between respective solar array strings and a battery charging bus such that, in the on state, each coupling switch delivers the output of the respective solar array string to the battery charging bus and, in the off state, each coupling switch delivers the output of the respective solar array string to the output power bus.

7. A string switching apparatus according to claim 1 further comprising a plurality of coupling diodes electrically connected between respective solar array strings and both the output power bus and the auxiliary power bus.

8. A string switching apparatus according to claim 7 wherein said plurality of coupling diodes comprise:

a plurality of output power coupling diodes electrically connected between respective solar array strings and the output power bus; and a plurality of auxiliary power coupling diodes electrically connected between respective solar array strings and the auxiliary power bus.

9. A string switching apparatus according to claim 1 wherein said plurality of shunt regulators comprise a plurality of field effect transistors.

10. A method of controllably connecting a plurality of solar array strings to one of an output power bus and an auxiliary power bus, the method comprising:

selectively directing an output of each solar array string to one of the output power bus, the auxiliary power bus and a shunt path such that the output power bus and the auxiliary power bus are maintained at respective predetermined power levels, wherein said selective direction of the output of each solar array string comprises:
actuating a shunt regulator in instances in which the output of a respective solar array string is to be directed to the shunt path and deactuating the shunt regulator in instances in which the output of the respective solar array string is to be directed to one of the output power bus and the auxiliary power bus; and switchably connecting the entire, unshunted output of the respective solar array string to one of the output power bus and the auxiliary power bus in instances in which the power is to be delivered to the respective power bus and switchably disconnecting the entire, unshunted output of the respective solar array string from the respective power bus in instances in which the power is to be delivered to the other power bus such that the entire, unshunted output of the respective solar array string is directed to only one power bus at a time.

11. A method according to claim 10 further comprising monitoring the respective power levels of the output power bus and the auxiliary power bus such that the selective direction of the output of each solar array string is based upon the monitored power levels.

12. A method according to claim 10 wherein said switchably connecting and disconnecting comprises switchably connecting the output of the respective solar array string to the auxiliary power bus in instances in which the power is to be delivered to the auxiliary power bus and switchably disconnecting the output of the respective solar array string from the auxiliary power bus in instances in which the power is to be delivered to the output power bus.

13. A method according to claim 12 wherein the auxiliary power bus is a battery charging bus, and wherein said switchably connecting and disconnecting comprises switchably connecting the output of the respective solar array string to the battery charging bus in instances in which the power is to be delivered to the battery charging bus and switchably disconnecting the output of the respective solar array string from the battery charging bus in instances in which the power is to be delivered to the output power bus.

14. A method according to claim 10 wherein the shunt regulator comprises a field effect transistor, and wherein actuating the shunt regulator comprises switching the field effect transistor to an on state and deactuating the shunt regulator comprises switching the field effect transistor to an off state.

15. A method according to claim 14 wherein each solar array string is switchably connected to one of the output power bus and the auxiliary power bus by a field effect transistor, wherein switchably connecting the output of the respective solar array string to one of the output power bus and the auxiliary power bus comprises switching the respective field effect transistor to an on state, and wherein switchably disconnecting the output of the respective solar array string from the respective power bus comprises switching the respective field effect transistor to an off state.

* * * * *

(12) EX PARTE REEXAMINATION CERTIFICATE (7023rd)
United States Patent
Lynch et al.

(10) Number: US 6,246,219 C1
(45) Certificate Issued: Aug. 25, 2009

(54) STRING SWITCHING APPARATUS AND ASSOCIATED METHOD FOR CONTROLLABLY CONNECTING THE OUTPUT OF A SOLAR ARRAY STRING TO A RESPECTIVE POWER BUS

(75) Inventors: Thomas Henry Lynch, Chatsworth, CA (US); Robert Kezerian Wilde, Thousand Oaks, CA (US); John Keith Branom, Newbury Park, CA (US); James Allen Hartung, West Hills, CA (US)

(73) Assignee: The Boeing Company, Seattle, WA (US)

Reexamination Request:
No. 90/007,915, Feb. 7, 2006

Reexamination Certificate for:
Patent No.: 6,246,219
Issued: Jun. 12, 2001
Appl. No.: 09/535,391
Filed: Mar. 24, 2000

(51) Int. Cl.
*G05F 3/16* (2006.01)

(52) U.S. Cl. .......................... 323/223; 323/906; 320/101
(58) Field of Classification Search .......................... None
See application file for complete search history.

(56) References Cited

U.S. PATENT DOCUMENTS 5,157,280 A * 10/1992 Schreck et al. ......... 365/185.23

6,181,115 B1   1/2001 Perol et al. .................. 323/234

OTHER PUBLICATIONS

"Breadboarding of Generic High Voltage/High Power Bus Conditioning", Statement of Work, European Space Agency, Jan. 27, 2000.

* cited by examiner

*Primary Examiner*—Margaret Rubin

(57) ABSTRACT

An improved string switching apparatus and method is provided for controllably connecting a plurality of solar array strings to an output power bus. The string switching apparatus can include a plurality of field effect transistors electrically connected in parallel with respective solar array strings and a digital controller for controllably switching the field effect transistors between on and off states to thereby control the power level of the output power bus. The field effect transistors can be switched between an on state in which the output of the respective solar array string is shunted and an off state in which the output of the respective solar array string is delivered to the output power bus. In addition to merely providing power to an output power bus, the string switching apparatus and method can controllably connect the plurality of solar array strings to either an output power bus or an auxiliary power bus, such as a battery charging power bus. In addition to the plurality of shunt regulators, the string switching apparatus can include a plurality of coupling switches electrically connected between respective solar array strings and one of the output power bus and the auxiliary power bus for controllably directing the power to a selected one of the power buses.

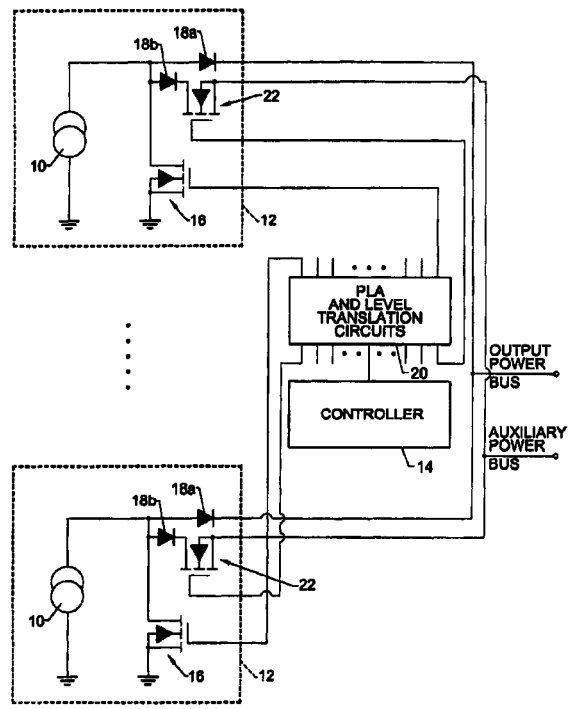

US 6,246,219 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–3 are cancelled.

Claims 4, 5, 7, 9 and 10 are determined to be patentable as amended.

Claims 6, 8 and 11–15, dependent on an amended claim, are determined to be patentable.

New claims 16–18 are added and detemined to be patentable.

4. A string switching apparatus [according to claim 3 further] *for controllably connecting a plurality of solar array strings to one of an output power bus and an auxiliary power bus, the string switching apparatus* comprising*:*
   *a plurality of shunt regulators electrically connected in parallel with respective solar array strings, each shunt regulator capable of alternately shunting an output of the respective solar array string and delivering the output of the respective solar array string to one of the output power bus and the auxiliary power bus;*
   *a plurality of coupling switches electrically connected between respective solar array strings and one of the output power bus and the auxiliary power bus, each coupling switch capable of switching between an on state in which an entire, unshunted output of the respective solar array string is delivered to the respective power bus and an off state in which the entire, unshunted output of the respective solar array string is directed to the other power bus such that the entire, unshunted output of the respective solar array string is directed to only one power bus at a time;*
   *a controller for controlling said plurality of shunt regulators and said plurality of coupling switches to thereby control the delivery of power to both the output power bus and the auxiliary power bus;*
   *a plurality of first drive circuits associated with respective coupling switches and responsive to said controller, wherein each first drive circuit controllably switches the respective coupling switch between on and off states in response to commands from said controller;*
   *a plurality of second drive circuits associated with respective shunt regulators and responsive to said controller, wherein each second drive circuit controllably switches the respective shunt regulator between an on state in which the output of the respective solar array string is shunted and an off state in which the output of the respective solar array string is delivered to one of the output power bus and the auxiliary power bus in response to commands from said controller; and*
   *a programmable logic array that includes said plurality of first and second drive circuits for controlling said coupling switches and said shunt regulators, respectively, in response to commands from said controller.*

5. A string switching apparatus according to claim [1] *4* wherein said plurality of coupling switches are electrically connected between respective solar array strings and the auxiliary power bus such that, in the on state, each coupling switch delivers the output of the respective solar array string to the auxiliary power bus and, in the off state, each coupling switch delivers the output of the respective solar array string to the output power bus.

7. A string switching apparatus according to claim [1] *4* further comprising a plurality of coupling diodes electrically connected between respective solar array strings and both the output power bus and the auxiliary power bus.

9. A string switching apparatus according to claim [1] *4* wherein said plurality of shunt regulators comprise a plurality of field of effect transistors.

10. A method of controllably connecting a plurality of solar array strings to one of an output power bus and an auxiliary power bus, the method comprising:
   *providing a controller and a programmble logic array responsive to commands from the controller for controlling delivery of power to both the output power bus and the auxiliary power bus; and*
   selectively directing an output of each solar array string to one of the output power bus, the auxiliary power bus and a shunt path such that the output power bus and the auxiliary power bus are maintained at respective predetermined power levels, wherein said selective direction of the output of each solar array string comprises:
      actuating a shunt regulator *with the programmable logic array in response to a command from the controller* in instances in which the output of a respective solar array string is to be directed to the shunt path and deactuating the shunt regulator in instances in which the output of the respective solar array string is to be directed to one of the output power bus and the auxiliary power bus; and
      *in response to biasing signals from the programmable logic array,* switchably connected the entire, unshunted output of the respective solar array string to one of the output power bus and the auxiliary power bus in instances in which the power is to be delivered to the respective power bus and, *in response to biasing signals from the programmable logic array,* switchably disconnecting the entire, unshunted output of the respective solar array string from the respective power bus in instances in which the power is to be delivered to the other power bus such that the entire, unshunted output of the respective solar array string is directed to only one power bus at a time.

16. *A string switching apparatus for controllably connecting a plurality of solar array strings to one of an output power bus and an auxiliary power bus, the string switching apparatus comprising:*
   *a plurality of shunt regulators electrically connected in parallel with respective solar array strings, each shunt regulator capable of alternately shunting an output of the respective solar array string and delivering the output of the respective solar array string to one of the output power bus and the auxiliary power bus;*
   *a plurality of coupling switches electrically connected between respective solar array strings and one of the output power bus and the auxiliary power bus, each coupling switch capable of switching between an on state in which an entire, unshunted output of the respec-* tive solar array string is delivered to the respective power bus and an off state in which the entire, unshunted output of the respective solar array string is directed to the other power bus such that the entire, unshunted output of the respective solar array string is directed to only one power bus at a time;

a controller for providing commands to control said plurality of shunt regulators and said plurality of coupling switches to thereby control the delivery of power to both the output power bus and the auxiliary power bus; and a programmable logic array for controlling said coupling switches and said shunt regulators in response to the commands from said controller.

17. A string switching apparatus according to claim 16 wherein said programmable logic array further comprises a plurality of first drive circuits associated with respective coupling switches and responsive to said controller, wherein each first drive circuit controllably swtiches the respective coupling switch between on and off states in response to the commands from said controller.

18. A string switching apparatus according to claim 17 wherein said programmable logic array further comprises a plurality of second drive circuits associated with respective shunt regulators and responsive to said controller, wherein each second drive circuit controllably switches the respective shunt regulator between an on state in which the output of the respective solar array string is shunted and an off state in which the output of the respective solar array string is delivered to one of the output power bus and the auxiliary power bus in response to the commands from said controller.

* * * * *